United States Patent [19]
Shah

[11] Patent Number: 5,853,583
[45] Date of Patent: Dec. 29, 1998

[54] MULTI-FUNCTIONAL LINEAR MOTION SHAKER FOR PROCESSING DRILLING MUD

[75] Inventor: Dilipkumar P. Shah, Houston, Tex.

[73] Assignee: Kem-Tron Technologies, Inc., Houston, Tex.

[21] Appl. No.: 829,059

[22] Filed: Mar. 31, 1997

[51] Int. Cl.$^6$ .................................................. B01D 33/03
[52] U.S. Cl. .................... 210/340; 210/384; 210/388; 210/389; 209/365.1; 209/365.2; 209/253; 209/269; 209/404; 175/206
[58] Field of Search ................................. 210/359, 384, 210/388, 433.1, 340, 499, 389; 209/364, 365.1, 365.2, 268, 269, 253, 404, 405; 175/206

[56] References Cited

U.S. PATENT DOCUMENTS

| | | |
|---|---|---|
| 3,347,373 | 10/1967 | Dahlberg . |
| 4,152,255 | 5/1979 | Musschoot . |
| 4,272,366 | 6/1981 | Dean et al. . |
| 4,340,469 | 7/1982 | Archer . |
| 4,350,591 | 9/1982 | Lee . |
| 4,457,839 | 7/1984 | Bailey . |
| 4,887,464 | 12/1989 | Tannenbaum et al. . |
| 4,911,834 | 3/1990 | Murphy . |
| 5,190,645 | 3/1993 | Burgess .................................. 210/188 |

Primary Examiner—Robert Popovics
Attorney, Agent, or Firm—Jackie Lee Duke

[57] ABSTRACT

A multi-functional linear motion shaker includes a rectangular outer support frame with a tank, often referred to as a "possum belly", for receiving the incoming drilling fluid flow. A set of adjustable louvers and a tray is positioned on the side of the tank. The adjustable louvers and tray serve to screen out the larger and stickier drill cuttings or solids. A vibrating deck assembly is positioned within the outer support frame adjacent the tank and tray assembly. The vibrating deck assembly is of a double deck design whose upper and lower decks include cross members to support the mud screens. The upper and lower decks are vertically spaced apart and connected together into one unit by vertical structural members. A moveable plate is positioned on the upper deck adjacent the adjustable louvers and tray. This moveable plate can be positioned to direct drilling fluid flow to the upper deck or repositioned to redirect fluid flow to the lower deck and bypass the upper deck. The moveable plate allows the shaker to function as a multi-functional linear motion shaker which allows configuration of the shaker as a single or double deck flowline shaker, as a drying shaker or as a combination simultaneous flowline shaker and drying shaker. The multi-functional linear motion shaker allows easy replacement of upper or lower screens independently of one another when used in a double deck shaker configuration.

8 Claims, 6 Drawing Sheets

MULTI-FUNCTIONAL LINEAR MOTION SHAKER FOR PROCESSING DRILLING MUD

BACKGROUND OF THE INVENTION

1. Field of the Invention

This invention relates to an Improved linear motion shaker used in oil and gas drilling operations which offers multiple functional configurations in a compact package. These shakers, often referred to as "shale shakers" in the industry, are part of a solids control system used in oil and gas drilling operations to separate the solid material removed from the well bore, referred to as "solids", by the drilling operations from the drilling fluid, commonly referred to as "mud". The drilling fluid or "mud" is composed of a finely ground clay base material to which various chemicals and water are added to form a viscous fluid. This drilling fluid is pumped down the hollow drill pipe, through the drill bit and returned to the surface in the annular space between the drill pipe and the well bore.

The drilling fluid serves three main purposes: it aids in cooling the drilling bit and thereby increasing its useful life, it flushes the cuttings or "solids" referred to earlier from the well bore and returns them to the surface for processing by the solid control system, and it leaves a thin layer of the finely ground clay base material along the well bore walls which helps prevents caving in of the well bore wall. Although often referred to simply as "mud", in fact the drilling fluid is a complex composition which must be carefully engineered and tailored to each individual well and drilling operation. Thus the drilling fluid is costly and it is used and reused in a closed loop system in which the solid control system and linear motion shaker of the present invention play an important role.

In order for the drilling fluid to be used and reused it must be processed after returning from the well bore to remove the aforementioned solids and maintain its proper density, often expressed as pounds per gallon or "mud weight", i.e., 10 lb./gal. mud or "10 lb. mud". The first step in processing the returned drilling fluid is to pass it through a shaker with a screen which removes solids in the 200 to 700 micron size range while allowing the drilling fluid to pass through the screen. This type of shaker is referred to as a single deck flow line shaker Depending on the type and size of the solids being brought up from the well bore, some rigs will be equipped with a double deck shaker with a coarse mesh screen on top and a finer mesh screen on the bottom. The combination of the two screens will remove solids down to the 200 to 300 micron size range. Current technology dictates most drilling rigs will have two of these double deck shakers of identical configuration to handle the volume of drilling fluid required.

Solids, which are discarded from the top of the shaker screen, discharge into a pit or onto a conveyor and the underflow drilling fluid flows into the tank below. The drilling fluid in the tank is stirred with an agitator before being pumped to additional solids control equipment known as desanders and desilters. The desander will remove abrasive solids and sand particles down to the 60 micron size range. The desilter will then remove solids down to the 20 micron size range. At this point the underflow from the desander and desilter, which is mostly solids with a small amount of drilling fluid is then sent to a third shaker referred to as a drying shaker or mud cleaner. This shaker has a very fine screen to allow the drying of the removed solids and recapture of as much of the costly drilling fluid as possible.

The drilling fluid is then processed through a centrifuge to remove solids down to the 2 micron size range before being recirculated into the well bore.

Problems associated with the current technology shakers include difficulty in changing the lower screens in a double deck shaker, the need for an additional shaker as a drying shaker or mud cleaner and the lack of screen area due to limitations on shaker size for a given rig floor space. The multi-functional linear motion shaker of the current invention offers a substantial increase in productivity by allowing multiple configurations of the shaker as a single or double deck flowline shaker, as a drying shaker or as a combination simultaneous flowline shaker and drying shaker and ease of replacement of upper or lower screens independently of one another when used in a double deck shaker configuration. This is all done in a single, compact unit without requiring an additional set of vibratory motors.

2. Description of Related Art

Various types of shaker designs utilizing various shapes are well known in the prior art. These prior devices all fail in one or more respects to address the problems described.

SUMMARY OF THE INVENTION

In view of the disadvantages with the known types of linear motion shakers, the present invention provides a multi-functional linear motion shaker which allows configuration of the shaker as a single or double deck flowline shaker, as a drying shaker or as a combination simultaneous flowline shaker and drying shaker. The multi-functional linear motion shaker of the present invention allows easy replacement of upper or lower screens independently of one another when used in a double deck shaker configuration. This is all done with a single set of vibratory motors currently used on existing designs thereby making the design cost effective.

The multi-functional linear motion shaker includes a rectangular outer support frame of structural steel called a "carriage". At one end of the support frame carriage is a tank, often referred to as a "possum belly", for receiving the incoming drilling fluid flow from an inlet port positioned in the lower portion of the tank. A set of adjustable louvers and a tray is positioned on the opposite side of the tank from the inlet port. The adjustable louvers and tray serve to screen out the larger and stickier drill cuttings or solids. A vibrating deck assembly, often called a bed, is positioned within the carriage adjacent the tank and tray assembly.

The vibrating deck assembly or "bed" is of a double deck design. Each deck is a rectangular frame of structural steel. The upper and lower decks include cross members to support the screens which are retained by tension bolts connected to the rectangular frame or pretensioned screens which may be anchored by wedges to the frame. The upper and lower decks are vertically spaced apart and connected together into one unit by vertical structural members or side panels. A moveable plate is positioned on the upper deck adjacent the adjustable louvers and tray. This moveable plate can be positioned to direct drilling fluid flow to the upper deck or repositioned to redirect fluid flow to the lower deck and bypass the upper deck.

At each corner of the vibrating deck assembly or bed, mounting pads are positioned with coil springs connected to their lower face. The springs extend downward to stationary guides on the outer frame or carriage. At the mounting pads opposite the inlet tank, or the end where solids are discarded, screw jacks are positioned which allow the angle of the vibrating deck assembly or bed of the multi-functional linear motion shaker to be adjusted. At the midpoint of the upper deck a structural member connects the lateral sides of the upper deck and provides a mounting pad for a pair of counter rotating motors. These motors cause the linear motion shaker to vibrate or shake and thereby move the solids along the screens and onto a solids removal conveyor. The drilling fluid passes into the tank, up and through the adjustable louvers and down through the screens, where it flows back to the mud holding tank.

It is a principal object of the present invention to provide a multi-functional linear motion shaker which offers a substantial increase in productivity by offering more screening are without increasing the shaker floor space or height, allowing the shaker to be configured in several ways thereby obviating the need for multiple shakers of a single, limited configuration.

Another principal object of the present invention is to provide a multi-functional linear motion shaker which can be used as a combination simultaneous flowline shaker and drying shaker.

Another object of the present invention is to provide a multi-functional linear motion shaker which may be used as a single deck or double deck flowline shaker.

A final object of the present invention is to provide a multi-functional linear motion shaker which allows the upper and lower screens to be replaced independently of one another while maintaining substantially the same screening area for both decks.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
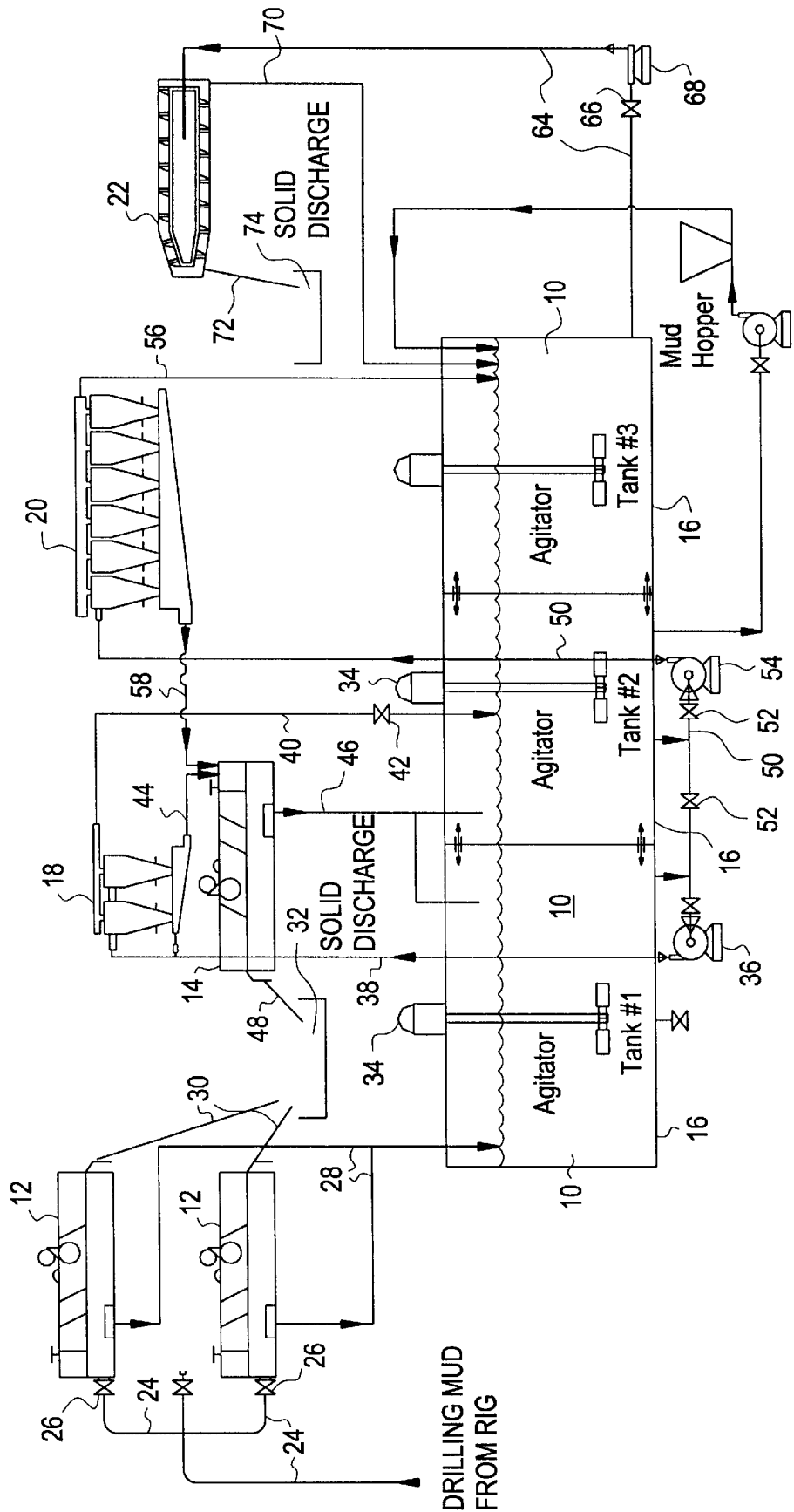
FIG. 1 is a flow diagram of the prior art solid control system typically used in oil and gas drilling operations.

With reference to the drawings, and particularly to FIG. 1, a flow diagram of the prior art solid control system typically used in oil and gas drilling operations is shown. The main components of such a system include drilling fluid or mud 10, conventional double deck flowline shakers 12 and conventional single deck drying shaker 14, well known to those of ordinary skill in the art. The other main components of a prior art solid control system include mud tanks 16, hydrocyclone or desander 18, hydrocyclone or desilter 20 and centrifuge 22. Assorted piping, pumps and valves which will be described in greater detail hereinafter, complete the system.

A typical sequence for the processing of drilling fluid or mud 10 begins with drilling fluid or mud 10 from the well bore flowing through piping 24 and valves 26 to double deck flowline shakers 12. Double deck flowline shakers 12 are of a conventional design with the upper deck screen having a coarse mesh and the lower deck screen having a fine mesh. This design allows the upper coarse screen to "scalp" or remove the large sized solids down to the 200 to 700 micron range. Remaining drilling fluid 10 passes through the upper deck screen to the finer mesh screen of the lower deck, further screening drilling fluid 10 and removing solids down to the 100 micron range. The particle range size of solids removed will vary according to the screen mesh size. Drilling fluid 10 is then returned through piping 28 or flows down to the first mud tank 16. The solids removed by double deck flowline shakers 12 are taken by solids conveyer 30 to holding tank 32.

Drilling fluid 10 is then stirred by agitator 34 to maintain its consistency and viscosity. Drilling fluid 10 is pumped by pump 36 through piping 38 to desander 18. Overflow drilling fluid 10 from desander 18 is returned to the second mud tank 16 through piping 40 and valve 42. Underflow drilling fluid 10 processed by desander 18 is routed through piping 44 to conventional single deck drying shaker 14. Drying shaker 14 is of a conventional design with a single deck fine mesh screen. This design allows the removal of solids down to the 70 micron range. Underflow drilling fluid 10 is then returned through piping 46 to the second mud tank 16. The solids removed by single deck drying shaker 14 are taken by solids conveyer 48 to holding tank 32.

Drilling fluid 10 is then stirred by agitator 34 in the second mud tank 16 to maintain its consistency and viscosity. Drilling fluid 10 is further processed by taking drilling fluid 10 from the second mud tank 16 through piping 50 and valving 52 through pump 54 which pumps it to desilter 20. Overflow drilling fluid 10 is returned to the third mud tank 16 through piping 56. Underflow drilling fluid 10 processed by desilter 20 is routed through piping 58 to conventional single deck drying shaker 14 where it is processed as previously described. Underflow drilling fluid 10 is then returned through piping 46 to the second mud tank 16.

Agitator 34 in the third mud tank 16 stirs drilling fluid 10 to maintain its consistency and viscosity. A final processing of drilling fluid 10 occurs with pump 68 drawing drilling fluid 10 from the third mud tank 16 through piping 64 and valve 66 and pumping it to centrifuge 22. Drilling fluid 10 processed by centrifuge 22 is routed through piping 70 to the third mud tank 16. Centrifuge 22 allows the removal of solids down to the 2 micron range. The solids removed by centrifuge 22 are taken by solids conveyer 72 to holding tank 74.

Figure 2:
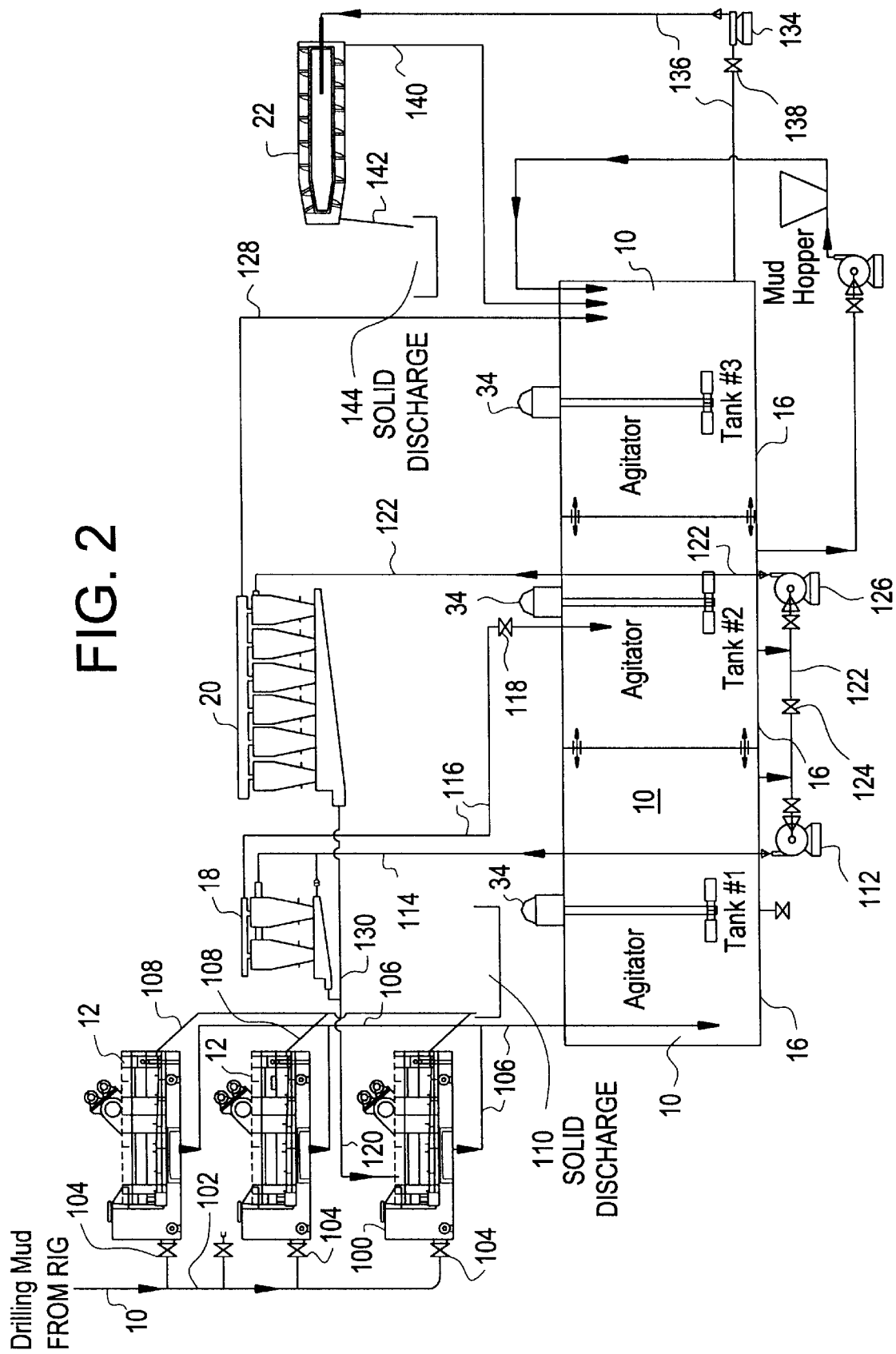
FIG. 2 is a flow diagram of the solid control system utilizing the multi-functional linear motion shaker of the present invention.

FIG. 2 shows a flow diagram of the solid control system utilizing the multifunctional linear motion shaker of the present invention. Those components of the system which are the same as in the prior art system of FIG. 1 retain the same numeral designation. The main components of the system include drilling fluid mud 10, conventional double deck flowline shakers 12 and the multi-functional linear motion shaker 100 of the present invention configured as a double deck combination simultaneous flowline and drying shaker with the upper deck a drying shaker for fine screening and the lower deck a flowline shaker for coarse screening. Its structure and method of use will be described in detail hereinafter. The other main components of the improved solid control system include mud tanks 16, hydrocyclone or desander 18, hydrocyclone or desilter 20 and centrifuge 22. Assorted piping, pumps and valves complete the system.

A typical sequence for the processing of drilling fluid or mud 10 begins with drilling fluid or mud 10 from the well bore flowing through piping 102 and valves 104 to double deck flowline shakers 12. Double deck flowline shakers 12 function as previously described. Drilling fluid 10 is also routed to multi-functional linear motion shaker 100 where drilling fluid 10 is directed to the coarse mesh screen of the lower deck by means to be discussed hereinafter. Drilling fluid 10 is then returned through piping 106 to the first mud tank 16. The solids removed by double deck flowline shakers 12 and the lower deck of multi-functional linear motion shaker 100 are taken by solids conveyer 108 to holding tank 110.

Drilling fluid 10 is then stirred by agitator 34 to maintain its consistency and viscosity. Drilling fluid 10 is pumped by pump 112 through piping 114 to desander 18. Overflow drilling fluid 10 is returned to the second mud tank 16 through piping 116 and valve 118. Underflow drilling fluid 10 processed by desander 18 is routed through piping 120 to the upper deck of multi-functional linear motion shaker 100. This upper deck has a fine mesh screen which allows it to function as a drying shaker to remove the solids down to the 70 micron range. Underflow drilling fluid 10 from desander 18, which has passed through the upper deck fine screen and flowed through the lower deck coarse mesh screen, is then returned through piping 106 to the first mud tank 16. The solids removed by the upper deck of multi-functional linear motion shaker 100 are taken by solids conveyer 108 to holding tank 110.

Drilling fluid 10 is then stirred by agitator 34 in the second mud tank 16 to maintain its consistency and viscosity. Drilling fluid 10 is further processed by taking drilling fluid 10 from the second mud tank 16 through piping 122 and valving 124 by pump 126 which pumps it to desilter 20. Overflow drilling fluid 10 is returned to the third mud tank 16 through piping 128. Underflow drilling fluid 10 processed by desilter 20 is routed through piping 130 to the upper deck of multi-functional linear motion shaker 100. This upper deck has a fine mesh screen which allows it to function as a drying shaker as previously described. Underflow drilling fluid 10 from desander 18, which has passed through the upper deck fine screen and flowed through the lower deck coarse mesh screen, is then returned through piping 106 to the first mud tank 16. The solids removed by the upper deck of multi-functional linear motion shaker 100 are taken by are taken by solids conveyer 108 to holding tank 110.

Agitator 34 in the third mud tank 16 stirs drilling fluid 10 to maintain its consistency and viscosity. A final processing of drilling fluid 10 occurs with pump 134 drawing drilling fluid 10 from the third mud tank 16 through piping 136 and valve 138 and pumping it to centrifuge 22. Drilling fluid 10 processed by centrifuge 22 is routed through piping 140 to the third mud tank 16. Centrifuge 20 allows the removal of solids down to the 2 micron range. The solids removed by centrifuge 22 are taken by solids conveyer 142 to holding tank 144.

Figure 3:
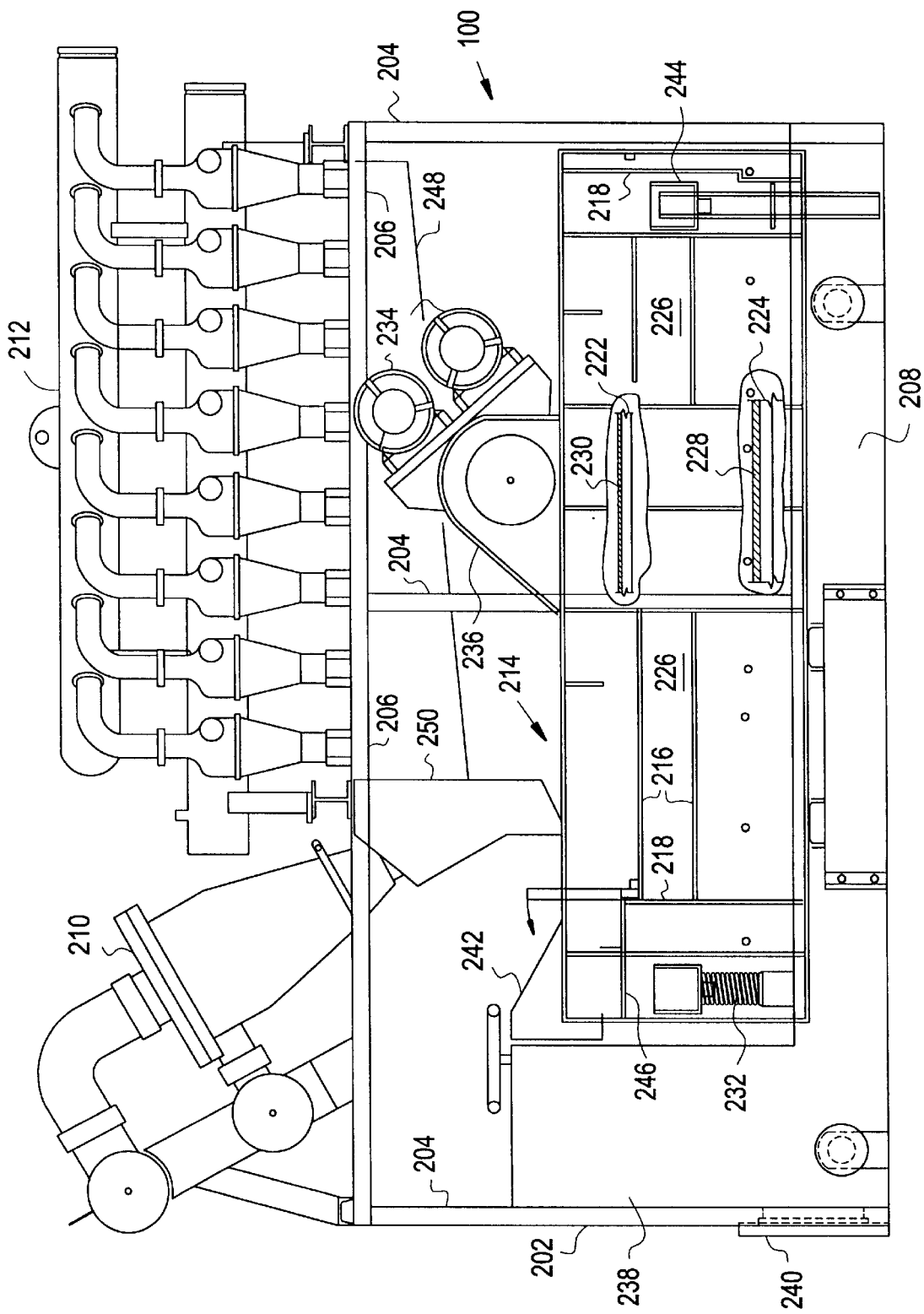
FIG. 3 is an elevation view of the multi-functional linear motion shaker of the present invention configured as a double deck flowline shaker.

FIG. 2 is a schematic representation of the flow of drilling fluid 10 through a typical solids control system utilizing multi-functional linear motion shaker 100 of the present invention. The actual details of construction of multi-functional linear motion shaker 100 are best seen in FIG. 3. Multi-functional linear motion shaker 100 includes a hydrocyclone frame 202 which is composed of vertical uprights 204 and upper horizontal members 206 welded into a generally rectangular support structure and mounted on carriage frame 208. Hydrocyclone frame 202 supports a desander 210 and desilter 212 when multi-functional linear motion shaker 100 is used as a double deck combination simultaneous flowline and drying shaker with the upper deck a drying shaker for fine screening and the lower deck a flowline shaker for coarse screening as schematically shown in FIG. 2.

Multi-functional linear motion shaker 100 also includes a bed frame 214 which is composed of channel sections 216 and vertical channels 218 welded into a rectangular parallelepiped shape. Horizontal support channels 220 (not shown) connect the laterally disposed channel sections 216 to form vertically spaced upper deck 222 and lower deck 224. Channel sections 216 are vertically spaced and vertical channels 218 are horizontally spaced to form screen access openings 226 for lower deck 224. Screen access openings 226 are sized to allow installation and removal of lower deck screen 228 independently of upper deck screen 230. Bed frame 214 is supported on springs 232 positioned at each of its four corners. Springs 232 are mounted on carriage frame 208 to support bed frame 214 above carriage frame 208 and isolate hydrocyclone frame 202 and carriage frame 208 from the vibratory motion of bed frame 214. The vibratory motion of bed frame 214 is provided by a pair of counter rotating vibrator motors 234 mounted on motor support frame 236 which spans bed frame 214 and is attached thereto.

A drilling fluid inlet tank 238, often referred to as a "mud box" or "possum belly" is positioned adjacent bed frame 214 and mounted on carriage frame 208. Drilling fluid inlet tank 238 includes inlet flange 240 through which drilling fluid 10 will flow into the tank. The top of drilling fluid inlet tank 238 is open to allow drilling fluid 10 to overflow onto gumbo tray 242, positioned above upper deck 222 of bed frame 214. A pair of manual screw jacks 244 are positioned at the corners of bed frame 214 opposite the drilling fluid inlet tank 238. Manual screw jacks 244 are positioned between springs 232 and carriage frame 208 to allow adjustment of the angle of bed frame 214. A diverter plate 246 is positioned on upper deck 222 adjacent the drilling fluid inlet tank 238. Troughs 248 and 250 cooperate with desander 210 and desilter 212 in a manner to be explained hereinafter to direct drilling fluid 10 onto upper deck screen 230.

Figure 4:
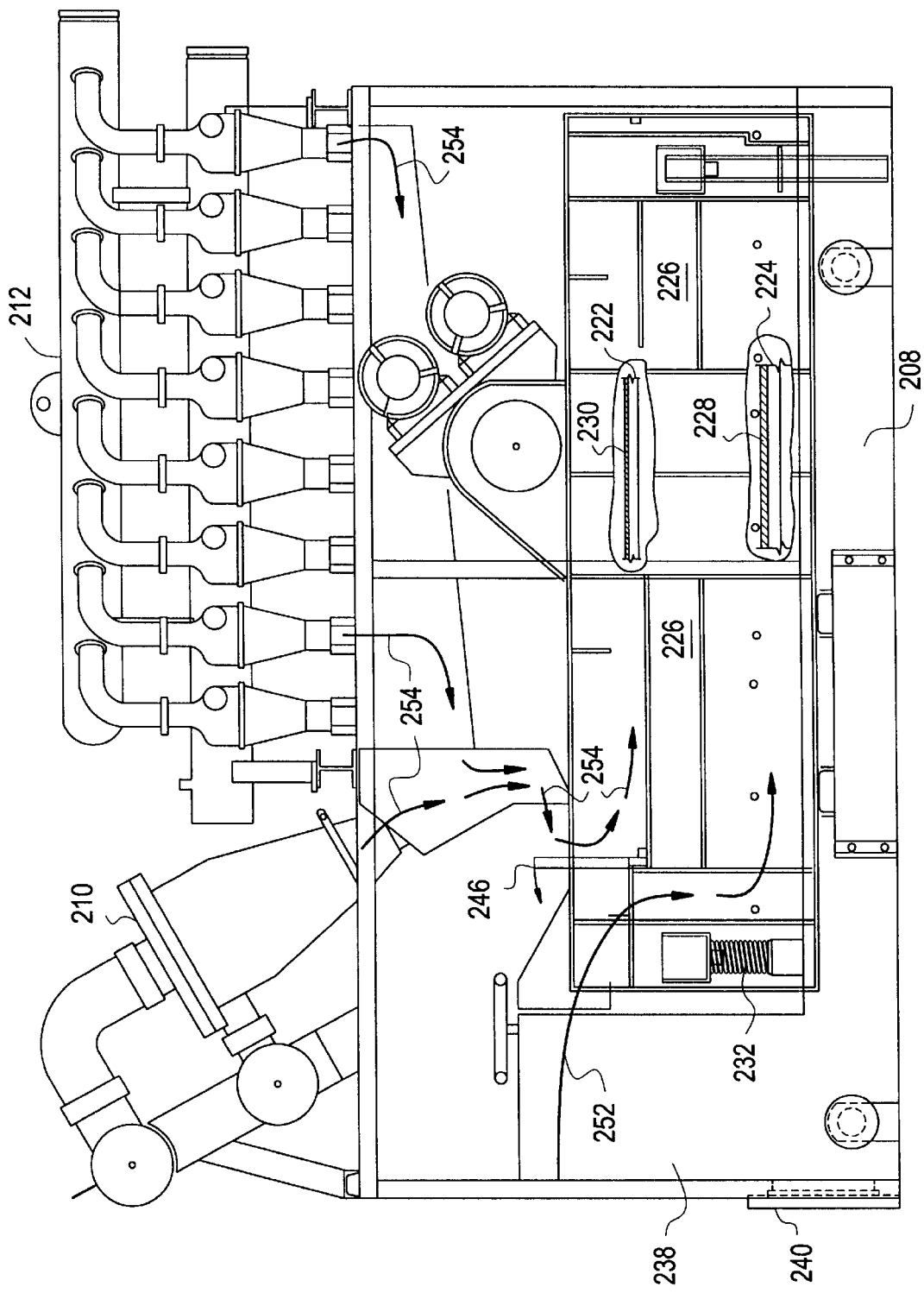
FIG. 4 is an elevation view of the multi-functional linear motion shaker of the present invention configured as a double deck combination simultaneous flowline and drying shaker with the upper deck a drying shaker for fine screening and the lower deck a flowline shaker for coarse screening.

As best seen in FIG. 4, when it is desired to operate multi-functional linear motion shaker 100 as a double deck combination simultaneous flowline and drying shaker, diverter plate 246 is positioned in a vertical position. This allows two independent drilling fluid flow paths. The first flow path 252 takes unscreened drilling fluid flow and directs it to the lower deck 224 and lower deck screen 228 which is a coarse mesh screen. This flow path functions as a flowline shaker removing the larger sizes of solids. Simultaneously, a second flow path 254 takes prescreened drilling fluid flow and directs it to the upper deck 222 and upper deck screen 230 which is a fine mesh screen. This flow path functions as a drying shaker.

Figure 5:
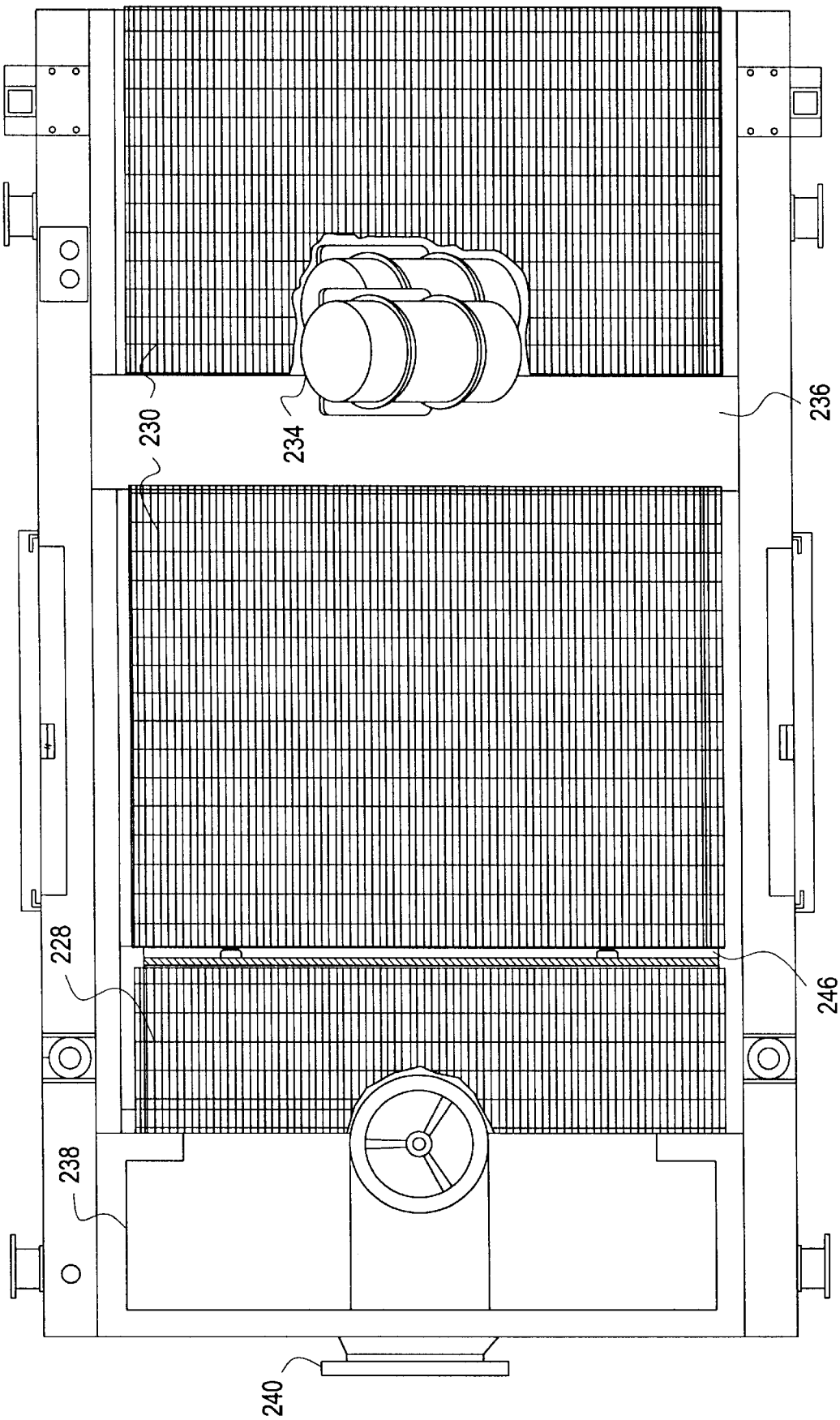
FIG. 5 is a plan view of the multi-functional linear motion shaker of FIG. 4 showing details of the present invention configured as a double deck combination simultaneous flowline and drying shaker with the upper deck a drying shaker for fine screening and the lower deck a flowline shaker for coarse screening.
Figure 6:
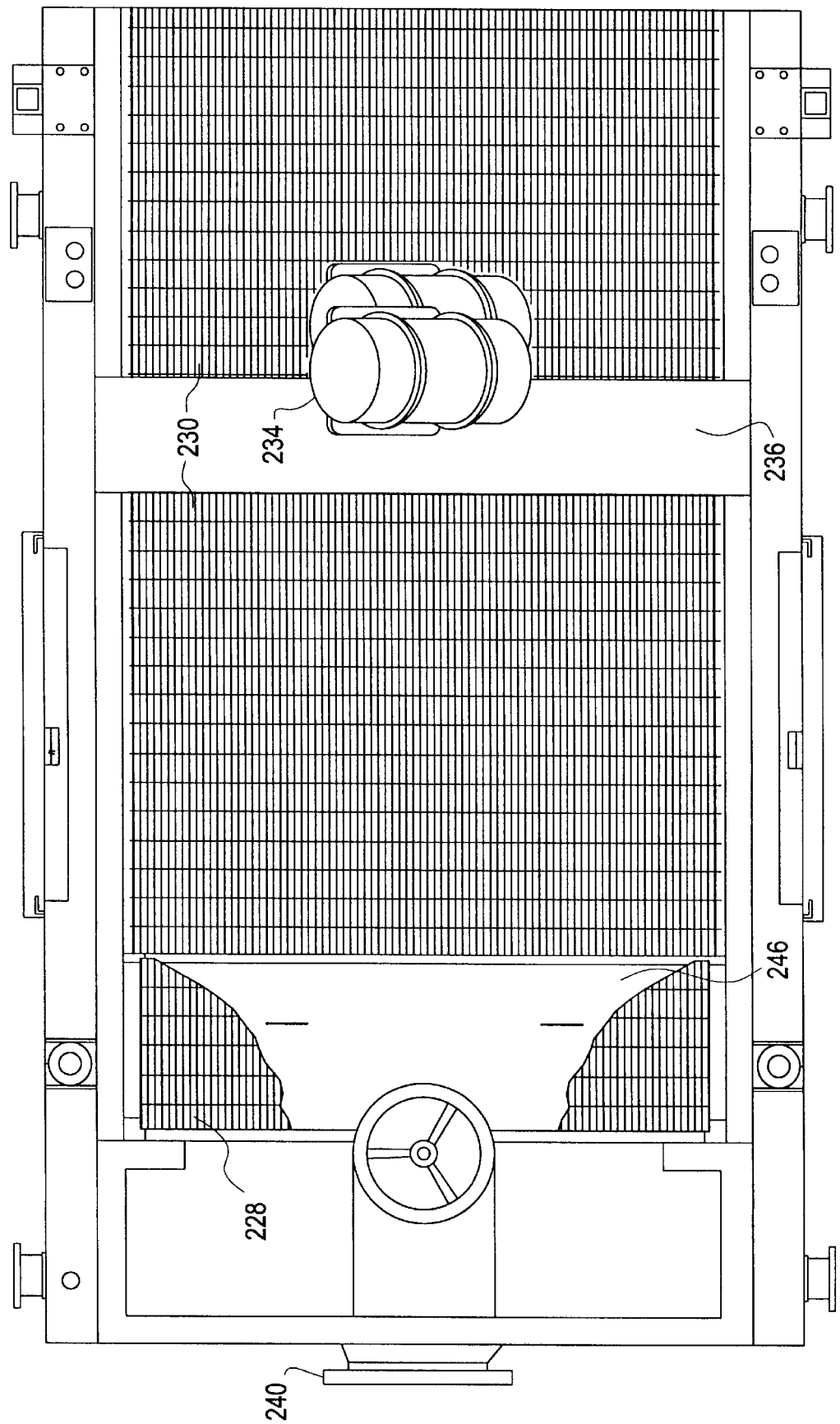
FIG. 6 is a plan view of the multi-functional linear motion shaker of FIG. 3 showing details of the of the present invention configured as a conventional double deck flowline shaker with the upper deck utilizing a coarse screen and the lower deck utilizing a fine screen.

FIGS. 5 and 6 show a plan view of the multi-functional linear motion shaker 100 with desander 210, desilter 212 and hydrocyclone frame 202 removed. In FIG. 5, diverter plate 246 is in the "up" position, thereby allowing multi-functional linear motion shaker 100 to function as a double deck combination simultaneous flowline and drying shaker with the independent flow paths as shown in FIG. 4. FIG. 6 shows diverter plate 246 in the "down" position, thereby forcing drilling fluid flow onto upper deck screen 230. Drilling fluid flow passes through upper deck screen 230 and onto lower deck screen 228, thereby functioning as double deck flowline shaker.

The construction of my multi-functional linear motion shaker will be readily understood from the foregoing description and it will be seen I have provided an improved multi-functional linear motion shaker which may be used as a single deck flowline shaker, a double deck flowline shaker or as a combination simultaneous flowline shaker and drying shaker. My multi-functional linear motion shaker also provides a linear motion shaker which allows the upper and lower screens to be replaced independently of one another while maintaining substantially the same screening area for both decks. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A linear motion shaker used in oil and gas drilling operations which is configurable as a flowline shaker or as a combination simultaneous flowline shaker and drying shaker, said linear motion shaker comprising:

a carriage support frame, a bed frame supporting an upper deck and a lower deck in a spaced vertical relationship, said bed frame supported within said carriage frame, a means for imparting vibratory motion to said bed frame, a drilling fluid inlet tank attached to said carriage frame and adjacent said upper deck and said lower deck, said drilling fluid inlet tank configured to direct drilling fluid flow onto said upper deck, and said upper deck including means for diverting said drilling fluid flow directly to said lower deck and thereby bypassing said upper deck to allow isolation of independent drilling fluid flows to each of said upper deck and said lower deck.

2. A linear motion shaker used in oil and gas drilling operations which is configurable as a flowline shaker or as a combination simultaneous flowline shaker and drying shaker according to claim 1 wherein:

said upper deck includes a mesh screen for separating solids from said drilling fluid flow, said lower deck includes a mesh screen for separating solids from said drilling fluid flow, and the area of said upper deck screen and the area of said lower deck screen being substantially equal.

3. A linear motion shaker used in oil and gas drilling operations which is configurable as a flowline shaker or as a combination simultaneous flowline shaker and drying shaker according to claim 2 wherein:

said bed frame includes laterally disposed access openings adjacent said lower deck to allow replacement of said lower deck mesh screens independently of said upper deck mesh screens.

4. A linear motion shaker used in oil and gas drilling operations which is configurable as a flowline shaker or as a combination simultaneous flowline shaker and drying shaker according to claim 3 wherein:

said means for diverting said drilling fluid flow is a moveable plate.

5. A linear motion shaker used in oil and gas drilling operations which is configurable as a flowline shaker or as a combination simultaneous flowline shaker and drying shaker according to claim 4 wherein said means for imparting vibratory motion to said upper deck and said lower deck includes:

a pair of counter rotating vibrator motors, a motor support frame attached to said bed frame, and said pair of counter rotating vibrator motors mounted on said motor support frame.

6. A linear motion shaker used in oil and gas drilling operations which is configurable as a flowline shaker or as a combination simultaneous flowline shaker and drying shaker according to claim 5 including:

a means for isolating vibratory motion of said bed frame from said carriage frame.

7. A linear motion shaker used in oil and gas drilling operations which is configurable as a flowline shaker or as a combination simultaneous flowline shaker and drying shaker according to claim 6 wherein said means for isolating vibratory motion of said deck frame from said shaker support frame includes:

a spring positioned at each corner of said bed frame, said springs supporting said bed frame within said carriage frame, and said springs allowing vibratory motion of said bed frame with respect to said carriage frame.

8. A linear motion shaker used in oil and gas drilling operations which is configurable as a flowline shaker or as a combination simultaneous flowline shaker and drying shaker according to claim 7 including:

an angle adjustment means disposed on said carriage frame, and said angle adjustment means cooperating with said springs and said bed frame to allow adjustment of the angle of said bed frame.

* * * * *